July 28, 1959  W. J. DURKIN  2,896,906
TURBINE COOLING AIR METERING SYSTEM
Filed March 26, 1956  2 Sheets-Sheet 1

INVENTOR.
WILLIAM J. DURKIN
BY
ATTORNEYS

July 28, 1959 W. J. DURKIN 2,896,906
TURBINE COOLING AIR METERING SYSTEM
Filed March 26, 1956 2 Sheets-Sheet 2

INVENTOR.
WILLIAM J. DURKIN
BY
ATTORNEYS

United States Patent Office 2,896,906
Patented July 28, 1959

2,896,906

TURBINE COOLING AIR METERING SYSTEM

William J. Durkin, Johnson County, Kans., assignor, by mesne assignments, to the United States of America as represented by the Secretary of the Navy Application March 26, 1956, Serial No. 574,050

1 Claim. (Cl. 253—39.1)

This invention relates to a cooling system for aircraft gas turbine engines.

The developement of gas turbine engines has reached a point where higher turbine inlet temperatures are being required to obtain maximum thrust from aircraft gas turbine engines. However, the materials available at the present time are not capable of performing their expected functions at the higher temperatures. Furthermore, there is no material in the foreseeable future that will have the desired properties. It, therefore, appears that the proper solution lies in the use of a cooling system to hold the presently available materials within their temperature limitations.

The methods in present use to cool the turbines involve the use of part of the compressor air as the source of the cooling medium which necessarily means that the cooling system will operate at all times. The result of this is a performance loss and an increase in specific fuel consumption, and since the cooling air always flows through the turbine the effect of the increase in fuel consumption is always evident. This also involves the removal of part of the compressor air.

In the present invention, it is not necessary that the cooling air flow to the turbine for all operating conditions. A compressor external bleed is utilized to pump air to the turbine housing. The air is then divided and enters manifolds surrounding the stationary turbine vanes. The air flows through the stationary vanes of the first stage and then enters the driving fluid stream ahead of the first rotating blades. The other portion of the cooling air flows through the stationary vanes of the second stage to cool these vanes. After passing through the stationary second stage vanes, the cooling air passes through the inner shroud into a split circumferential manifold where it is distributed to the rotary vanes of the first and second stages. The cooling air enters the rotary vanes at their bases and passes out into the driving fluid stream through openings at the outer edges. The cooling air flow is controlled automatically by a valve in the inlet line which can be controlled from the engine or afterburner control system.

As a modification of the above device alternate methods of conducting air from the second stage stationary vanes inner shroud manifolds could be employed. Such means could comprise admitting the air into a sheetmetal impeller and then into the turbine rotating blades.

It is an object of this invention to provide a cooling system for a turbine engine so that it is not necessary to have the cooling system in operation during the entire period the engine is in operation.

It is a further object of this invention to provide a cooling system for a turbine engine whereby the cooling air is supplied by a compressor external bleed.

Other objects and many of the attendant advantages of this invention will be readily appreciated as the same becomes better understood by reference to the following detailed description when considered in connection with the accompanying drawing wherein.

Figure 1:
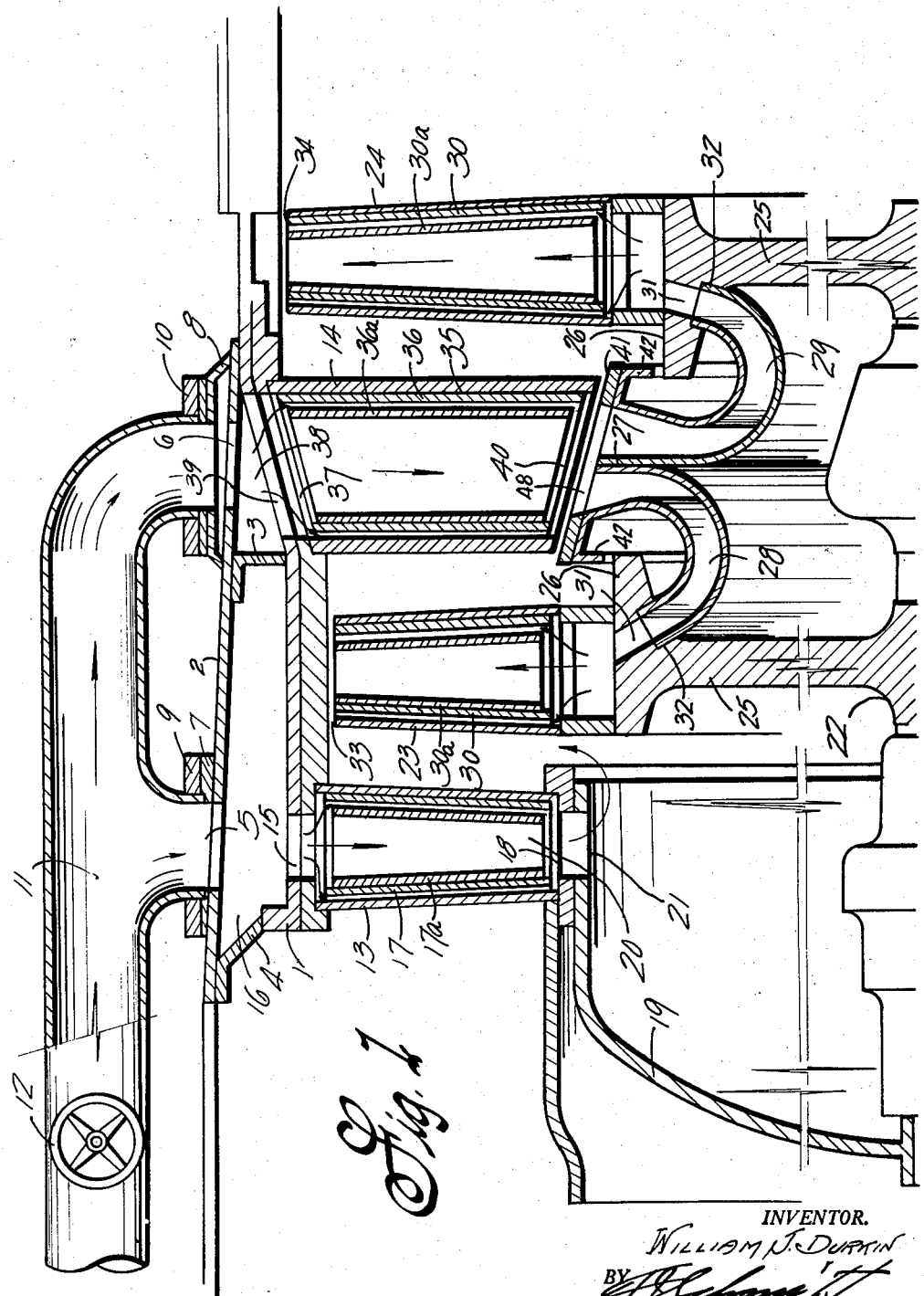
Figure 1 is a view in cross-section showing one form of the invention.

In Figure 1 there is disclosed a part of the circumferential turbine housing 1. A circumferential casing 2 incloses the turbine housing but is spaced therefrom to form a manifold section which is divided into two sections by a central partition 3. The end wall 4 and the central partition 3 secure the manifold casing 2 to the housing preferably as by welding. Leading into each section of the manifold are openings 5 and 6. The casing adjacent the openings is formed with circular local bosses 7 and 8. Mounted on the bosses 7 and 8 to form a tight seal are the exhaust ports 9 and 10 of the cooling air inlet pipe 11. A valve 12 located in the inlet pipe controls the amount of cooling air admitted to the manifold. This valve may be controlled by the engine or the afterburner controls. A plurality of inlet pipes may be mounted in the above manner completely around the circumference of the manifold casing 2.

Fixedly secured to the turbine housing 1 are the stator vanes of the turbine engine. A plurality of vanes 13 mounted in a row around the inner circumference of the housing 1 comprise the first stage. The second stage consists of the stator vanes 14 mounted in a similar manner. Each of the stator vanes 13 are mounted over a circular opening 15 in the housing and in communication with manifold section 16. The stator vanes 13 are hollow and receive a hollow corrugated heat transfer insert 17 and a sheet metal block off insert 17a. The other ends 18 of the stator vanes 13 are mounted on a circular support 19 of the turbine engine. An opening 20 in the vane and an opening 21 in the support allow the cooling air to pass through the stator vanes and then enter the driving fluid stream through the separation between the end of the support 19 and the first stage rotor, as shown by the arrow.

A shaft 22 is mounted for rotation within the turbine housing. A plurality of rotor blades 23 extending radially from the shaft constitute the first stage rotor blades. The second stage has a plurality of rotor blades 24 similarly mounted. The rotor blades 23 and 24 are mounted on disk members 25 having flange sections 26. A split circumferential manifold 27 has portions 28 and 29 secured to the inner side of the flange sections 26 to effectively form a first and a second manifold section. As shown (Fig. 1), it is preferred that the split manifold be formed of two portions by joining together two double or concentric walled casings 28 and 29 which are axially aligned and surround the shaft 22. The outer ends of the casings or manifold portions 28 and 29 are secured, as by welding, to the inner sides of the flanges 26 on disks 25; the inner ends of the inner walls are joined together and turned up toward the center of the outlets 40 of the second stage stators; whereas, the inner ends on the outer walls terminate at the outer sides of the second stage stators—that is, the inner or downstream end of the outer wall of portion 28 is adjacent the upstream side of the second stage stators, and the inner or upstream edge of the outer wall of portion 29 is adjacent the downstream side of the second stage stators—to define a circumferential inlet opening 48 through which air from the second stage stators may enter the annular passage defined between the inner and outer walls of the manifold. Each of the rotor blades 23 and 24 is lined with a hollow corrugated heat transfer insert 30 and a sheet metal block off insert 30a. A plurality of holes 31 in the circumferential flange sections 26 connect the interior of the blades 23 and 24 to the split circumferential manifold 27. The inner ends 32 of the manifold portions 28 and 29 form wall sections concentric with the flange sections 26—26 to inclose all the openings 31. Openings 33 in the tip of the blades 23 allow the cooling air to pass from the blade and enter the driving fluid stream. Similar openings 34 in the blades 24 allow the cooling air to enter the driving fluid stream.

Each stator vane 14 consists of a hollow shell 35 lined with a corrugated heat transfer insert 36 and a sheet metal block off insert 36a. An opening 37 in one of each vane is in communication with the manifold section 38 through a plurality of openings 39 in the turbine housing 1. At the other end of the vanes 14 an opening 40 directs the cooling air passing through the vanes into the manifold 27 through the inner shroud 41. Rim portions 42 on the split circumferential manifold 27 prevent the driving fluid stream from contacting portions 28 and 29. Sufficient clearance between the stator vanes 14 and the shroud 41 permits relative rotation between the manifold and the vanes.

During the operation of the turbine engine when it becomes desirable to cool the stator vanes and rotor blades, the valve 12 is opened. Cooling air enters the manifold sections 16 and 38 through the inlet pipe 11. From the section 16 the air flows inward through the first stage stator vanes to cool these parts and then passes out through the opening 20 to enter the driving fluid stream by way of the separation between the end of the support 19 and the first stage rotor. The cooling air in the second manifold section 38 flows inward through the secondary stage stator vanes 14 to cool these vanes and then enters the split circumferential manifold 27. Here the air is divided and passes through the openings 31 to the first and second stage rotor blades. The cooling air passes through the blades to cool them and then enters the driving fluid stream through the openings in the tips of the rotor blades. In passing through the vanes and blades, the cooling air flows, as shown by the arrows, along the corrugated heat transfer insert between the side walls of the blades and vanes and the sheet metal block off inserts. Thus, an effective cooling system is provided that can be operated when desired so that maximum fuel economy can be achieved.

Figure 2:
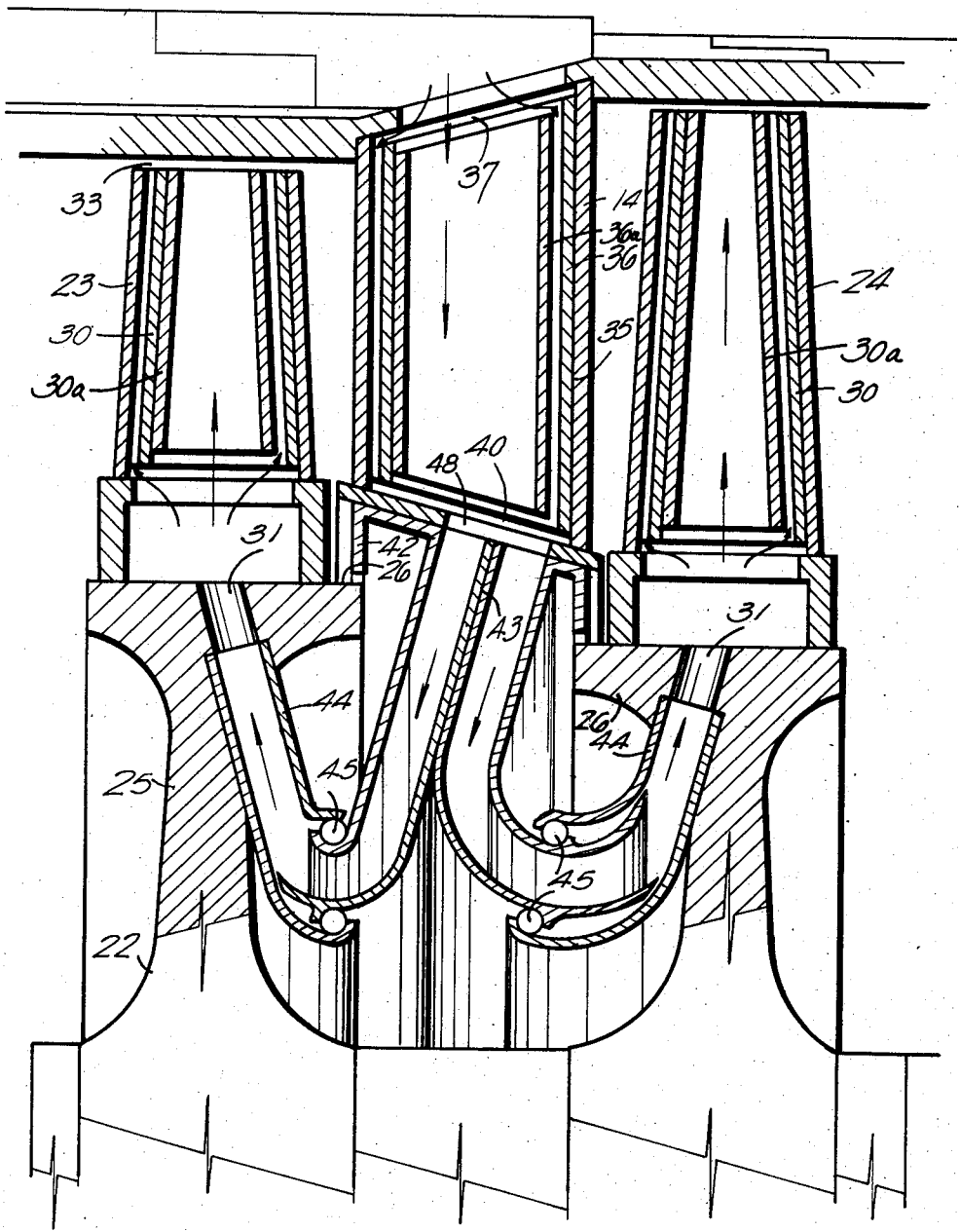
Figure 2 is a view in cross-section showing a modification of a section of the cooling system.

In Figure 2 there is disclosed a modification for conducting air from the second stage stator vanes to the rotor blades. A two passage manifold section 43, similar to manifold 27 in Fig. 1, extends around the inner circumference of the stator vanes 14 and encloses all of the openings 40. Two sheet metal ducts 44 extend around the inner circumference of the flanges 26 and enclosed the openings 31. A relatively rotatable connection between the manifold 43 and the ducts 44 is obtained by the ball joint 45. Thus, air flows from the stator vanes 14 through the divided manifold 43 and then to the rotor blades by the ducts 44 where it passes through the blades and into the driving fluid stream through the openings in the tip of the blades.

In the specification reference has been made to a two stage turbine engine. Obviously as many stages as desired could be cooled with apparatus functioning in the same manner as that described. By the use of the corrugated heat transfer inserts a greater amount of cooling is achieved by the system. The invention thus discloses a cooling system that operates from a compressor external bleed so that it is not necessary to be employed during all operation of the engine and therefore results in a lowering of specific fuel consumption.

Obviously many modifications and variations of the present invention are possible in the light of the above teachings. It is therefore to be understood that within the scope of the appended claim the invention may be practiced otherwise than as specifically described.

What is claimed is:

In a power plant having an air compressor, a tubular housing for passing a driving fluid stream in an axial direction, a plurality of first and second stage stator vanes secured on the inner circumference of said housing, a circumferential casing mounted on, spaced from, and surrounding said housing defining an annular cooling air passage therebetween, said stator vanes being provided with internal radial passages interconnected with said manifold and having outlets in their tips, air inlet means connected to said circumferential casing for supplying cooling air to said manifold from said compressor, a rotor shaft mounted for rotation in said housing, a disk mounted on said shaft having a flange with openings adapted for fluid communication with said outlets in said stator tips, a plurality of first stage rotor blades secured to said disk and radially extending therefrom in operable relation with said first stage stator vanes, a first casing means secured at one end to said flange on said disk and extending axially downstream to the upstream edge of said second stage stator vanes, said casing means surrounding and being radially spaced from said shaft thereby defining a first portion of a split circumferential manifold around said shaft, said first stage rotor blades being provided with internal passages having outlets in their tips and extending radially through said first stage rotor blades in communication with said first portion of said split circumferential manifold around said shaft through said openings in said flange, a second disk member mounted on said shaft downstream from said first disk, a second plurality of second stage rotor blades secured to said second disk and radially extending therefrom in operable relation with said second stage stator vanes, a second casing surrounding and spaced from said shaft having one end secured to the upstream side of said second disk thereby defining a second portion of said split circumferential manifold around said shaft, the other end of said second casing extending upstream and terminating on the downstream side of said second stage stator vanes thereby defining with the downstream end of said first casing a circumferential inlet radially aligned with the second stage stator outlets, said second stage rotor blade being provided with internal passages having outlets in their tips and extending radially through said second stage rotor blades whereby cooling air leaving said stator vanes will enter said annular passage portions around said shaft and pass through said first and second stage rotor blades and into the driving fluid stream from the tips of the rotor blades.

References Cited in the file of this patent

UNITED STATES PATENTS

| | | |
|---|---|---|
| 2,553,078 | Buck | May 15, 1951 |
| 2,647,368 | Triebbnigg | Aug. 4, 1953 |
| 2,650,060 | Stalker | Aug. 25, 1953 |
| 2,700,530 | Williams | Jan. 25, 1955 |